2,199,815

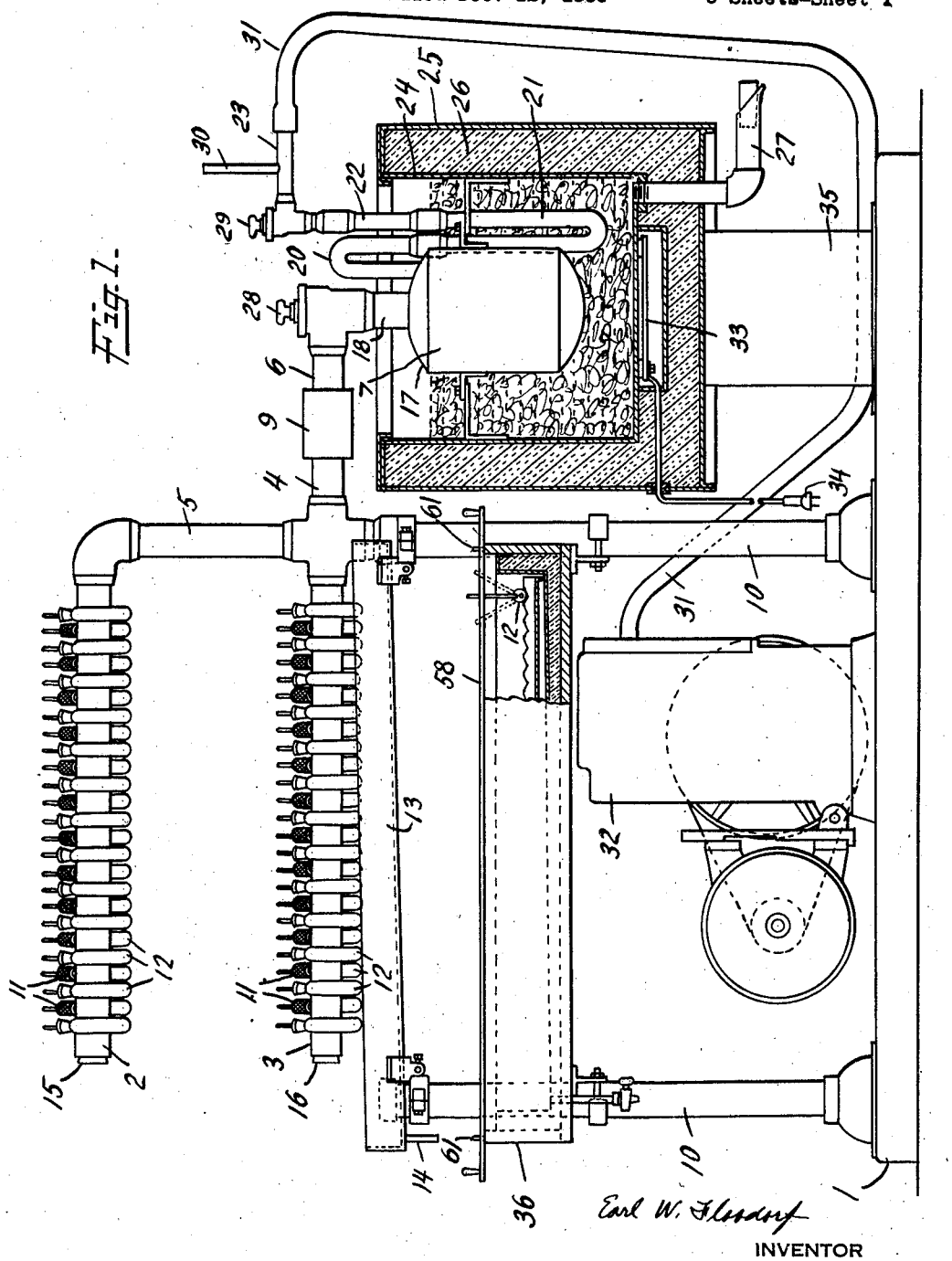

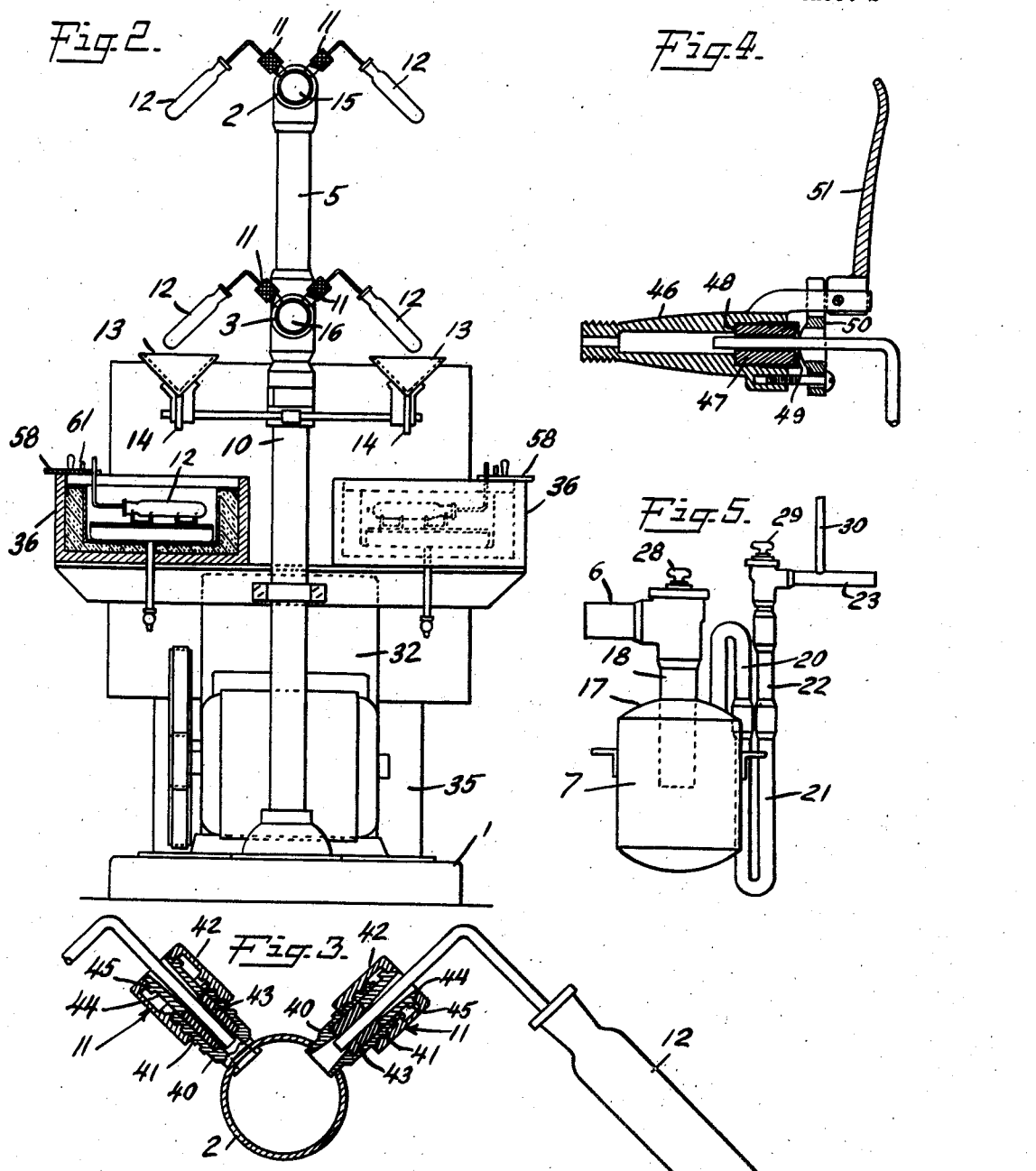

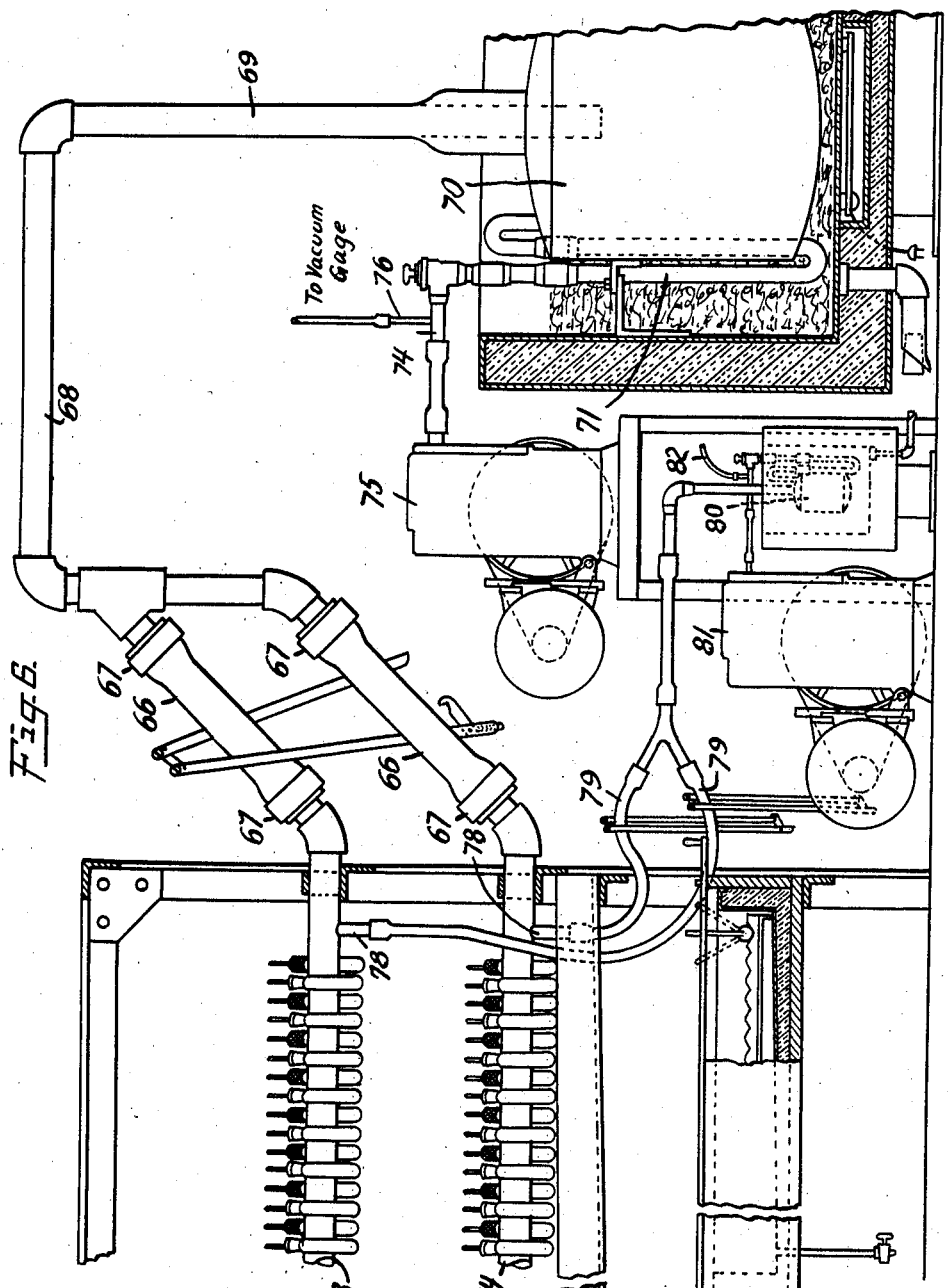

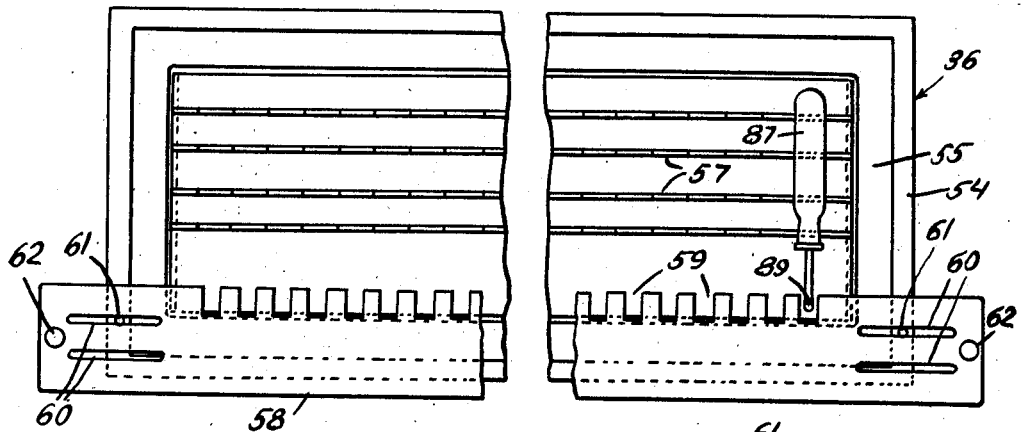
Fig. 7.
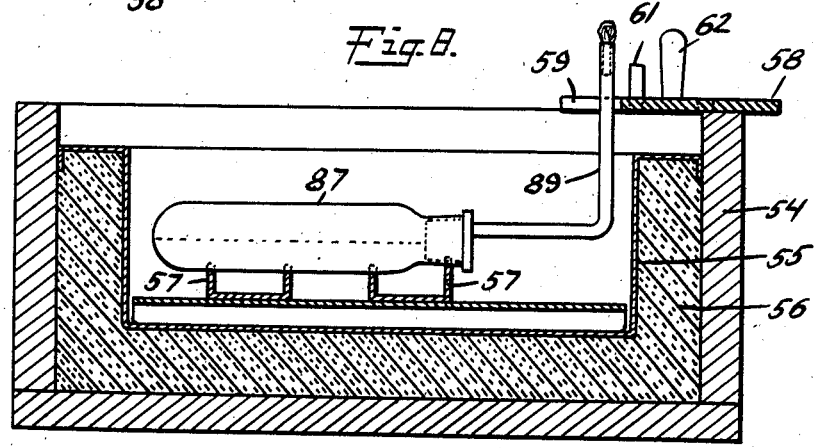
Fig. 8.
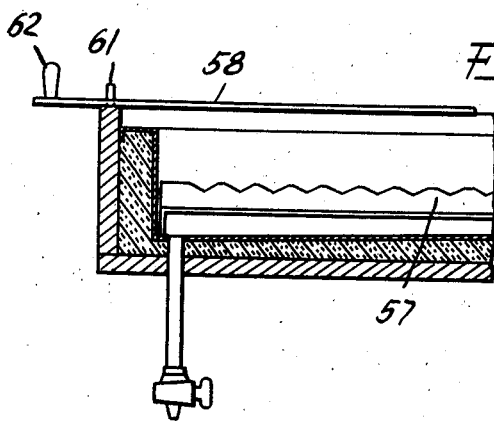
Fig. 9.
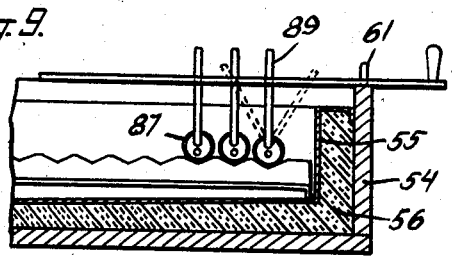
Earl W. Flosdorf
INVENTOR
BY Pennie Davis Marvin Edmonds
ATTORNEYS May 7, 1940. E. W. FLOSDORF 2,199,815
APPARATUS FOR THE TREATMENT OF BIOLOGICALLY ACTIVE PRODUCTS
Filed Dec. 12, 1935 5 Sheets-Sheet 5
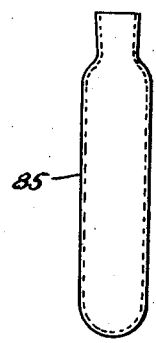
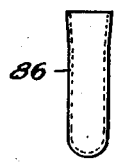
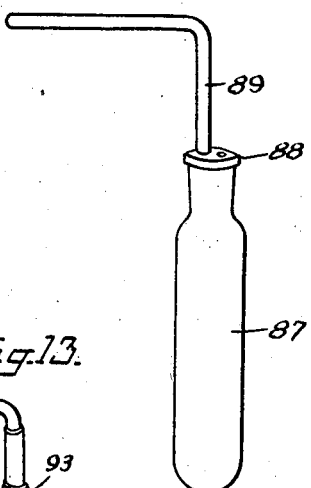
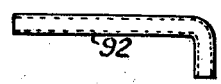
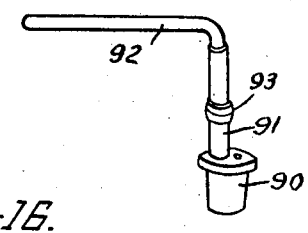
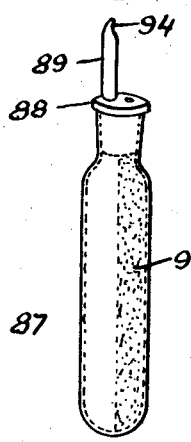
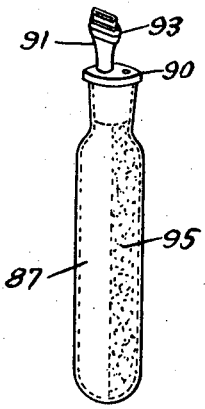
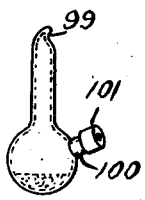
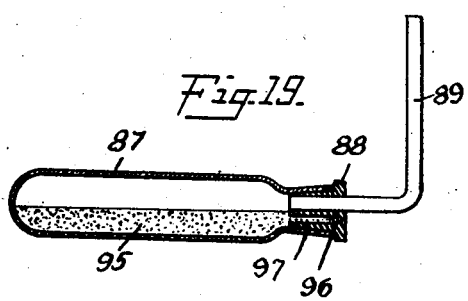
Earl W. Flosdorf INVENTOR
BY
ATTORNEYS Patented May 7, 1940

UNITED STATES PATENT OFFICE 2,199,815

APPARATUS FOR THE TREATMENT OF BIOLOGICALLY ACTIVE PRODUCTS

Earl W. Flosdorf, Ardmore, Pa., assignor to The Trustees of the University of Pennsylvania, Philadelphia, Pa., a corporation of Pennsylvania Application December 12, 1935, Serial No. 54,149

6 Claims. (Cl. 34—3)

The present invention relates to improvements in apparatus for the preservation of biologically active substances, such as sera, protein solutions, bacterial cultures, viruses and other labile biological substances; and more particularly to improvements in apparatus for the treatment and preservation of biologically active substances by freezing the substance, dehydrating it from the frozen state under a high vacuum, and carrying out the operation in the final individual containers in which the resulting product is to be kept until used.

One of the objects of the invention is the provision of apparatus adapted for the desiccation of serum and other labile biological materials from the frozen state in such manner as to provide for great rapidity and completeness of the desiccation, for carrying out the desiccation with asepsis preserved, and for sealing the container so that its contents are preserved under the original vacuum, thereby effectively protecting the desiccated contents from deterioration and prevention of ingress of air, moisture, microorganisms or other contaminants.

Another object of the invention is the provision of apparatus adapted for the production of serum or other biologically active materials in lyophile form in individual containers containing small and clinically usable amounts or units, or multiple units, of the serum or other material, and the provision of an apparatus for producing such product by accomplishing the required initial rapidity of freezing, great rapidity and completion of the water removal from the materials to be preserved, and the carrying out of these steps with asepsis preserved throughout, and finally enabling the sealing of the individual container so that its contents are preserved under the original vacuum, thereby effectively protecting the lyophile content from deterioration by prevention of ingress of air, moisture, micro-organisms, or other contaminants.

Another object of the invention is the provision of an apparatus applicable to the treatment of the materials in the final containers, in which they are to be sealed and marketed, whereby a large number of such individual containers can be simultaneously processed, and a large number of individual containers produced, for distribution, marketing and use, and apparatus providing means for the rapid freezing of a number of individual containers at one time, the transferring of the containers and their connection to a multiple unit evacuating system, the removal of the ice and gases from the containers under a high vacuum with collection of the vapors in a suitable but remote condenser; and the sealing of individual containers while under the high vacuum and before their removal or disconnection.

Another object of the invention is to provide an improved apparatus for producing such lyophile or dry biologically active substances which utilizes the natural loss of heat through the rapid vacuum evaporation from the frozen product to keep the material frozen even though the containers are exposed to the room temperature, and are small individual containers.

Another object of the invention is to provide an improved apparatus adapted for the treatment of varying numbers of individual containers, and for the addition of containers to the apparatus used, and the withdrawal of the completed containers therefrom, without interfering with the continuity of the process or destroying the vacuum which is being maintained in other containers undergoing treatment.

Another object of the invention is to provide an improved apparatus with one or more large condensers for the main condensing operation, a plurality of manifolds provided for attachment to a considerable number of individual containers, one or more auxiliary condensers, and vacuum pumps for both the main and auxiliary condensers, together with provision for connecting the individual manifolds to either the main or auxiliary condensers, and for disconnecting the manifolds from the other condenser, whereby an individual manifold may be disconnected from the main system, a plurality of containers attached thereto, a high vacuum established through the auxiliary condenser and the vacuum pump, and this manifold then connected with the main system, and for similarly disconnecting the manifold and its containers when the process has been completed in such containers; and thereby providing for the treatment of a greater or smaller number of containers, as desired, and the addition to and removal from the system of part of the individual containers, without interfering with the processing of the other containers maintained under a high vacuum.

Other objects and features of the invention will appear from the following more detailed description.

Biological products, as now commonly distributed and marketed, are packaged and sealed in a liquid state. The marketing of such products in their present unstable form involves a serious economic waste and loss, because of loss of efficacy in the product between the time of manufacture and the time of administration or use, and because a considerable proportion of such products are a total loss, having passed their dates of expiration before use.

It has been proposed to improve the stability and keeping qualities of serum and other biological products by freezing liquid products and drying the frozen products under a high vacuum, but such products have not, insofar as I am aware, been available on the market in clinically usable form.

Dehydrated biological products in so-called "lyophile" form can readily be produced by the rapid freezing and rapid dehydration of frozen material in bulk, under a high vacuum. The serum, for example, can be frozen at about −78° C. in very large Pyrex or metal bulbs, connected to a large condenser contained in a refrigerant bath of solid carbon dioxide (Dry Ice) and acetone. The serum is kept in the frozen state solely by the rapid sublimation in vacuo of water vapor from its surface. The outer surfaces of the bulbs are surrounded merely by the air of the room at ordinary temperature which serves to heat the bulbs during the dehydration process. Such a process, for the treatment and preservation in bulk of large amounts of serum and other biological products has been developed by Dr. John Reichel of the Mulford Biological Laboratories.

Biological products produced in bulk by such processes are difficult to handle. In order to subdivide bulk-processed products into amounts and containers suitable for distribution and for clinical use of the product, the product has to be ground and weighed accurately and filled into containers. The lyophile product is hygroscopic and adheres readily to solid surfaces. It rapidly absorbs moisture when exposed to the air. The grinding of the product involves the danger of denaturation as well as absorption of moisture from the air and bacterial contamination. The accurate weighing and filling of containers with the ground powder are also difficult steps to carry out without contamination with water vapor or bacteria. The difficulty of handling such bulk material has led me to the present process which avoids the production and handling of bulk material, and which enables the product to be directly produced, in the final market container, in which the entire process is carried out continuously, and with sealing of the final containers, containing the dried or dehydrated or lyophile product, under the original vacuum under which the product is produced.

The apparatus of the present invention enables the process to be carried out in the final individual containers on a sufficiently large scale to make possible the commercial manufacture of such containers, which will contain the final dry or lyophile product, which can be sealed in the container in which it is produced, and which can be marketed in the same container in which it is produced, and without intermediate handling or contamination.

The product produced when serum is rapidly frozen and rapidly dehydrated from the frozen state under a high vacuum is a porous solid occupying practically the same volume as the liquid serum from which it was prepared. Its content of anti-bodies and complement suffers no detectable loss in processing, and the rate of subsequent deterioration is reduced to a small fraction of that in the liquid state. The porous product, on addition of distilled water, redissolves with remarkable ease and completeness. To serum so dehydrated the term "lyophile" has been applied by Dr. John Reichel of the Mulford Biological Laboratories; and while this term is used with a somewhat special connotation, it is a convenient term and serves to emphasize a noteworthy characteristic of the product so prepared, namely, its remarkable solubility. This solubility is a result both of the unaltered lyophilic properties of the serum protein and of the physical structure of the porous solid.

The invention enables the individual containers, after freezing of the material therein, to be rapidly connected with the evacuating system; and the invention includes improvements in the connection of the containers to the system.

The invention also provides for rapid evaporation of water vapor from the frozen material and for automatic regulation of the temperature; and the invention includes improvements in apparatus for accomplishing this result.

The invention also includes improvements in condensers, and condenser construction, for use in the carrying out of such a process as above described, together with improvements in the method of operation of such condenser.

Among the problems which were presented in developing apparatus for carrying out the process were the securing of automatic regulation of temperature during the processing of the product in the individual containers in which it is to be stored and distributed; completeness of the dehydration within a reasonable time; the provision of practical means of sealing and severing the containers individually without loss of the original vacuum; and the preservation of asepsis throughout the process.

One of the problems presented is that of providing for the necessary flow of vapors from the individual containers, in order to carry out the evaporation with sufficient rapidity to keep the material in the frozen state. Under the conditions of high vacuum I have found that the flow of vapor must be as much as 400 liters per minute from 25 ml. of serum. The xxxxx liquid serum contains usually around 90% by weight or more of water; and 25 ml. of water or ice produces approximately 236,000 liters of vapor at 0.1 mm. mercury pressure and at 0° C. In order to obtain automatic temperature control by regulating the rate of sublimation of water vapor from the product undergoing desiccation, I have found it important to have exhaust tubes, leading from the individual containers to the manifold of the vacuum apparatus which will permit the unrestricted flow of the water vapor; and I have also found it important to have a proper relationship between the volume of frozen material in the individual containers and the surfaces of the frozen materials, both the surface in contact with the walls of the containers, and the interior surface from which the sublimation or vaporization takes place. By proper control of the relation of volume and surfaces of the frozen material, and by providing outlet tubes for the containers which are properly proportioned, the temperature control is made automatic by regulating the rate of sublimation of water vapor from the product undergoing desiccation. The apparatus used satisfies certain critical relationships between the rate of the intake from the atmosphere to the exterior glass surface of the container, the rate of heat loss at the evaporating surfaces of the product, and the rate of escape of the water vapor from the product to the condenser. Adequate condensing surface must also be provided.

This automatic regulation of temperature, in the carrying out of the process with the material in the individual containers, is accomplished by the use of containers of proper size and shape and with a proper relationship of the evaporating surface of the frozen product to the surface adjacent the glass through which atmospheric heat is transferred to the frozen solid; by bringing the product in the containers to a very low temperature before attachment to the desiccating apparatus; by very rapid attachment of the containers to the manifold of the apparatus; by making all outlet tubes and connections between the containers and the condensers of large enough size or bore to offer a sufficiently free passage for the escaping water vapor; and by the rapid establishment and maintenance of a high vacuum throughout the apparatus.

The regulation of the relationship between the surfaces of the frozen product and its volume, and the use of containers of proper shape and size, enable the process to be completed within a reasonable time and with automatic regulation of temperature of the kind above referred to.

The invention will be further described in connection with specific illustrations thereof.

*The containers.*—In order to obtain rapid desiccation of the product from its frozen state it is important that there should be a proper relationship between the evaporating surface which consumes thermal energy and the rate of input of thermal energy. I have found that these rates can be regulated by control of the shape of the container, and the manner in which the material is frozen in the container. The poorest shape for a container is a sphere, because of its minimum surface per unit of volume, although the ratio can be greatly increased by using only a thin layer of material on the inside of the sphere. I have found the most practical means of securing a large surface to volume ratio, in order to utilize a maximum of the total volume of the container, is by using long cylindrically shaped containers. The material is frozen in the container on its side and when the amount is greater than about 20 ml. it is advantageous to impart a gentle rocking motion during the freezing in order to increase the evaporation surface.

The containers or receptacles are moreover of a size and shape which adapt them for use as the final containers of the processed material, and in which the material can be sealed, and in which the material can be restored by the addition of distilled water.

In size, the containers should in general be at least twice the size of the liquid serum or other material to be processed therein, so that the volume of material put into a container will not exceed about one-half the capacity of the container.

While containers as small as 2 to 5 ml. capacity are suitable and convenient for the preservation of materials in small amounts, in the case of such materials as virus suspensions or bacterial cultures, larger containers will in general be used, for example, up to containers of 50 ml. capacity for amounts of serum and similar products up to about 25 ml. in amount, which is about the largest unit of such material processed in a single container for clinical use.

Larger containers can, however, be used, when desired, such as for multiple unit amounts of the product. Containers of about 200 ml. capacity, or about 8 ounces, are suitable for processing and preserving amounts of materials up to around 100 ml. In certain of its aspects, the invention includes the use of containers for desiccating volumes of as much as 100 milliliters to 1 liter or more, in a container of correspondingly increased size, since even such large containers can be effectively sealed under the original vacuum by the rubber tube sealing method of the present invention. But, in general, for clinically usable amounts of the biological materials, the individual unit will not exceed around 20 to 25 ml., and the containers need not, in general, exceed about 50 ml. capacity, when properly proportioned. For certain materials, however, such as human milk, containers of around 200 ml. or 8 ounces capacity are suitable. Certain nursing bottles of the standard "clean-easy" type, when constructed with a suitably shaped and proportioned neck, are suitable for use.

The following table shows typical container sizes, with an indication of the approximate container volume, the maximum volume of serum or other materials to be processed, and to be contained in the container, the body length, diameter and wall thickness, and the length and diameter of the necks of the containers to adapt them for the rubber stopper closures by which an effective vacuum is to be maintained in the final containers.

TABLE 1

| Approximate container volume | Maximum serum volume | Body length | Body outside diameter | Wall thickness | Neck length | Neck, inside diameter | |
|---|---|---|---|---|---|---|---|
| | | | | | | Large end | Small end |
| *Ml.* | *Ml.* | *Mm.* | *Mm.* | *Mm.* | *Mm.* | *Mm.* | *Mm.* |
| 100 | 50 | 185 | 35 | 2.0 | 15 | 15.2 | 13.7 |
| 50 | 25 | 110 | 28 | 1.5 | 15 | 15.2 | 13.7 |
| 25 | 13 | 80 | 22 | 1.5 | 15 | 15.2 | 13.7 |
| 12 | 6 | 60 | 20 | 1.2 | 15 | 15.2 | 13.7 |
| 6 | 3 | 45 | 15.5 | 1.0 | 15 | 15.2 | 13.7 |
| 2 | 1 | Sphere 22 | 22 | 1.0 | 10 | 5.4 | 4.5 |
| 2 | 1 | | 16 | 1.0 | 11 | 7.8 | 6.8 |

From this table it will be noted that the size and shape of the neck, which is to receive the rubber stopper, is the same for containers of considerable variations in volume. This is advantageous and it enables a standard rubber stopper to be used, and one which is of a size which enables the container to be rapidly evacuated through an opening of suitable size extending therethrough.

I have found it is important, as above stated, to regulate the area and volume of the frozen material in order to obtain a proper ratio of surface area to volume. For processing the material in an effective and reliable manner, the size and shape of the cylindrical containers are advantageously such that the layer of frozen material on the side while in a horizontal position therein is not less than 3 millimeters in thickness at the vertical diameter nor more than 15 millimeters, and also such, as already pointed out, that the volume of the frozen material does not exceed about one-half the volume of the containers.

In general, the ratio of the interior serum evaporating surface to the interior surface of the frozen serum in contact with the walls of the container should be such that the evaporating surface has an area of at least about one-half that of the area of the frozen material in contact with the walls of the container. In general also, there should be a minimum of about 1 to 2 square centimeters of internal evaporating surface per millimeter of frozen serum. These volume-surface area relations, which are important during the production of the product, and the carrying out of the process, are retained in general in the final product, although the final product will be of a light, porous nature.

*The container stoppers.*—While the invention, in its broader aspects, is adapted for the production of an all glass container with an exhaust tube which is integral therewith and which is sealed to give an all glass sealed container; there are important advantages in utilizing a rubber stopper closure, when properly constructed and arranged, and this provides a new and valuable final product which not only contains the dehydrated product sealed under the original vacuum, but which also enables that product to be restored to a liquid state without breaking the vacuum.

Suitable sizes of rubber stoppers for use in containers such as are illustrated by Table 1 above, are given in the following table:

TABLE 2

*Rubber stopper sizes*

| No. | | Body length, mm. | Neck diameter large end, mm. | Neck diameter small end, mm. | Diameter of exhaust hole, mm. |
|---|---|---|---|---|---|
| 1 | For carrying glass exhaust tube | 15.0 | 16.2 | 14.0 | 5.0 |
| 2 | Rubber exhaust tube-stopper | 16.0 | 16.8 | 15.1 | 6.5 |
| 3 | Small rubber exhaust tube-stopper | 10.0 | 9.0 | 7.5 | 4.0 |

The first two stoppers given in the table fit the same size neck, but with the first stopper allowance must be made for the fact that the glass tube, which extends through the stopper, is not compressible.

The second rubber stopper in the above table, referred to as rubber exhaust tube stopper, has an integral rubber tubing extension, extending from the stopper, which extension is about 32 mm. long, 9.5 mm. outside diameter, and 6.5 mm. inside diameter, the inside of the tube furnishing and forming an extension of the exhaust hole in the stopper itself. This special tube-stopper is molded in one piece. The wall thickness of the tubing is such as to permit effective clamping, by clamping devices attached thereto, to insure a permanent air-tight vacuum seal. The third stopper is similar to the second but smaller in size.

In inserting the stoppers in the tubes, they should be first lubricated with sterile distilled water, since a stopper which does not require lubrication would not in general be sufficiently tight. The rubber stock of which the stoppers are made should be a fairly pure gum stock containing some filler and an anti-oxidant to aid the stopper in withstanding autoclaving. When the stoppers are autoclaved and sterilized before use, it is desirable to wrap them in a protective material. They should not be autoclaved in place in the container neck since the heating of the rubber while subjected to pressure interferes with obtaining the necessary tight fit and tends to reduce its outside diameter and destroy the vacuum tightness of the fit.

For high vacuum tightness, with a rubber stopper, a great compression of the rubber is essential. This is obtained by tapering both the neck of the container and the stopper, and by lubricating the stopper before it is inserted, so that there is a maximum of compression on the entire length of the neck surface. The upper limit of compression is that which will not squeeze the holes to too small a diameter and which will not cause undue distortion of the stopper because of unequal stresses over its length. This procedure also tends to reduce the porosity of the rubber.

*The exhaust tube.*—The importance of having an exhaust tube of sufficient cross-sectional area to permit the rapid removal of a large amount of vapor under the high vacuum, has already been pointed out. In general, the resistance to flow of the vapor through the tube is inversely proportional to the square of the diameter and directly proportional to the length of the tube.

For containers which contain up to 25 ml. of serum or product, the minimum bore of an exhaust tube of uniform bore, and of the L-shaped type which I have used is about 3.0 mm. For the constricted type of tube, the minimum bore and minimum length of the constricted portion is about 2.0 mm. diameter and 10 mm. length, if the remainder of the tube has a bore of 7.0 mm. diameter. For amounts of from 25 to 100 ml. of material the minimum bore for a uniform bore tube is about 4.0 mm.

Where the containers have more than about 100 ml. of material per container, a somewhat larger exhaust tube is necessary, such as tubes of 7.5 to 8.5 mm. bore having a short constriction of, e. g., 4 mm. inside diameter which is only long enough to permit effective sealing. Such a larger exhaust tube is well adapted for use with 100 ml. or more of the material to be preserved.

The exhaust tube is advantageously made L-shaped, with one arm about 50 mm. long which extends through the rubber stopper into the container, and the other arm about 80 mm. long which is used for attachment to the manifold. The L-shape of the exhaust tube serves to protect the contents of the container during freezing and also assists in maintaining asepsis during processing.

When the integral rubber-tube-stopper is used, having a rubber exhaust tube integral with the stopper, this tube is attached to an L-shaped glass exhaust tube to permit connection with the exhaust manifold. The length of the rubber tube integral with the stopper, and the length of the arm of the glass L-tube to which it is attached, will together equal approximately the length of the corresponding arm of the L-shaped glass tube which is used without the rubber tube extension.

When the rubber tube-stopper is used, the container is finally sealed, at the end of the process, by compressing it sufficiently between parallel metal clamping surfaces under a sufficient pressure to hold a permanent vacuum seal on the tubing. The metal clamp must be of sufficient strength and rigidity to hold the rubber permanently compressed.

*Freezing of the material.*—I have devised a special freezing bath which enables the material in the cylindrical containers to be frozen while the containers are in a horizontal position, and with rocking of the containers when needed. For the production of a lyophile product, it is essential to accomplish rapid and almost instantaneous freezing to a low temperature, around −70° C. or lower, and I have also found it important to leave the containers and the material in them at this low temperature for a sufficient time to insure that the material comes to equilibrium at such low temperature, before attaching the containers to the manifold of the vacuum apparatus. Such low temperatures can readily be obtained by a bath made of carbon dioxide snow or Dry Ice and a suitable organic liquid, and the containers, with their liquid material, can be immersed in such a bath and the liquid material almost instantly frozen and brought to a low temperature. Ordinarily I leave the container in such a bath for a period of about half an hour to permit equilibrium to be established and to insure thorough cooling of the mass to the low temperature.

A number of the small individual containers can be frozen simultaneously and made ready for attachment to the manifold. The L-shaped exhaust tube attached to the containers prevents the freezing liquid from entering the containers and facilitates rocking of the containers when desired. With larger amounts of material, for example, more than about 20 ml. of material, it is advantageous to impart a gentle rocking motion during the freezing and while the container is in a horizontal position in order to increase the evaporation surface. With containers of about 200 ml. or 8 ounce capacity or more, the serum or other liquid should be frozen the entire circumference of the bottle in order to obtain the proper ratio of surface area and volume.

*The freezing bath.*—While the freezing bath may be made with the use of various organic liquids, such as an alcohol, acetone, etc., together with Dry Ice or solid carbon dioxide suspended in the organic liquid, I have found it particularly advantageous to use Methyl Cellosolve, which is the methyl ether of ethylene glycol. I have found the use of this liquid with the carbon dioxide snow or Dry Ice to be far superior to mixtures in which acetone, alcohol, ether, etc., are used. Methyl Cellosolve has a very much higher flash point than the other solvents, yet it has a low enough melting point to enable it to be used, and a low viscosity. It has no offensive odor or known health hazard, and it is readily available as a commercial product at a reasonable cost.

I have found it advantageous to use such a freezing or cold bath, or solid-liquid mixture, of Methyl Cellosolve and Dry Ice both for freezing the material in the individual containers, at the outset of the process, and also in the condensers. Carbon dioxide serves the purpose well for obtaining the desired low temperatures, giving a temperature of the frozen containers and of the condenser of —78° C.

Low temperature condensation affords the cheapest present known means of accomplishing the absorption of the water vapor at an adequately low aqueous tension. At the temperature of —78° C. the vapor tension of ice is approximately 0.001 mm. Hg. and this provides an enormous final differential from even the lowest normal room temperature conditions (about 15 mm.) to which the material is subjected before the completion of the process, that is, before completion of the drying operation and the sealing of the individual containers.

*Attachment of the individual containers to the manifold.*—In order to enable a considerable number of individual containers to be attached to a manifold within a short period of time, such that danger of melting of the frozen product is avoided, it is important to provide rapid means for attachment. The present invention provides for such rapid attachment such that as many as 100 individual containers can be connected to a manifold within a period of less than five minutes. The rapid freezing of the material and the holding of the containers and material to a low temperature, around —78° C., for a considerable time, before attaching the containers to the manifold, together with provision for very rapid attachment of the containers to the manifold, enables a large number of the containers to be attached, and the vacuum then applied to the containers, and the automatic self-refrigeration to be established, without danger of melting the frozen material. The angle of the outlets on the manifold is such that in combination with the L-shape of the exhaust tube, micro-organisms and other solid contaminants cannot fall from the manifold into the containers. This feature, aided by the rapid outward flow of vapors during dehydration helps to insure the maintenance of asepsis.

*Drying of the frozen material.*—When the individual containers have been attached to the manifold and subjected to a high vacuum, of, e. g., 0.01 to 0.05 mm. mercury, automatic regulation of the temperature of the product during desiccation in the individual containers will be established and maintained, if the containers have a proper ratio of volume of frozen material to surfaces, as previously explained. The heat loss due to sublimation of the ice from the frozen material keeps the product frozen at all stages of the process, while the heat from the surrounding air serves to heat the outside of the individual containers and to neutralize the heat loss, so that the temperature equilibrium is established which is below that at which the product will melt, until the ice is removed. As desiccation proceeds, and after the ice has disappeared from the product, it gradually increases in temperature until finally room temperature is reached, and the correspondingly high aqueous tension tends to drive off the last traces of contained water. This shortens the time needed for complete desiccation inasmuch as the temperature need not and will not automatically be kept below 0° C. after sublimation of ice has been completed, and the subsequent rise in temperature will insure completion of the drying operation.

The cooling effect due to the sublimation of ice under the high vacuum, when there is a proper ratio of surface and volume, as previously explained, results in the formation of a layer of frost or ice on the outside of the individual containers a short time after the vacuum is applied; and this ice layer remains until near the end of the drying operation when, as the temperature in the container rises, the ice melts, and the air of the room can then come into direct contact with the container itself to increase its temperature to room temperature whereas, while the containers are coated with frost or ice, the air acts upon this material instead of directly on the walls of the containers.

*The condenser.*—While various agents and means may be employed for absorbing the vapors escaping from the product under desiccation, low temperature condensation affords the cheapest present known means of accomplishing this absorption at an adequately low aqueous tension.

The present invention provides improvements in condenser construction for use with a low temperature bath, such as a mixture of Methyl Cellosolve and Dry Ice.

I have found it of advantage to make a metal condenser with its lower portion, which is in contact with the cold bath of a good conducting metal, and to make its upper portion, which is exposed to the atmosphere, or to which the connecting tubes are attached, of a metal which is a poor conductor. Such a bi-metallic construction has various advantages in minimizing deposit of ice on the metal which is a poor conductor, while promoting the deposit of ice on the metal which is a good conductor, and which is in contact with the low temperature freezing bath.

I also find it of advantage to use a large main condenser and a small auxiliary condenser and find that by doing so it is not necessary to have a separate tube of $P_2O_5$ or other protective material between the condenser and the vacuum pump. The main condensation takes place in the main condenser and the auxiliary condenser provides for condensation of any water vapor that passes through the main condenser uncondensed.

The invention will be further described in connection with the accompanying drawings, which illustrate, in a somewhat conventional and diagrammatic manner, apparatus illustrating and embodying the invention; but it will be understood that the invention is not limited thereto.

In the accompanying drawings:

Fig. 1 is an elevation of one form of apparatus, parts being shown in section;

Fig. 2 is an end view of the apparatus of Fig. 1 with one of the freezing trays in section;

Figs. 3 and 4 show two forms of quick acting adapters or chucks for attaching the exhaust tubes of the containers to the manifold;

Fig. 5 shows the condensers of Figs. 1 and 2 separated from the other parts of the apparatus;

Fig. 6 shows another apparatus, of a type adapted for larger scale operation;

Fig. 7 shows one of the freezing trays, separated from the rest of the apparatus;

Fig. 8 is a sectional view of a freezing tray showing one of the containers located in it;

Fig. 9 is a view showing part of the freezing tank and illustrating the method of rocking the containers in it;

Figs. 10 and 11 show two forms of containers, before use;

Fig. 12 shows an assembly of container, rubber stopper and glass exhaust tube before use;

Fig. 13 shows one form of the integral rubber tube stopper, and with a glass exhaust tube connected to the rubber tube;

Fig. 14 shows a glass exhaust tube for use in the assembly of Fig. 13;

Figs. 15 to 18 show different forms of the final containers with the dry material in them and sealed to maintain the vacuum; and Fig. 19 shows one of the containers with parts broken away to illustrate a preferred form of stopper construction and the material in the containers.

The apparatus illustrated in Figs. 1 and 2 is a unit apparatus with all of the parts shown as mounted on a suitable frame or support 1 for supporting the different parts of the apparatus.

The apparatus has a plurality of manifolds, which may vary in number, depending on the production capacity desired. Only two manifolds 2 and 3 are shown, these being connected by the duct 4 which has a side pipe 5 connected to the intake 6 of the condenser 7 by means of a coupling 9. The coupling shown is a flexible coupling in the form of a heavy rubber tube or pipe, and while a flexible coupling is not needed, it is a desirable type of connection. The manifolds are supported in any suitable manner as by the support 10. Each of the manifolds has a number of quick acting adapters or chucks 11 by which the containers 12 are attached to the manifold. Drip troughs 13 are provided for collecting any liquid or condensate from the containers, the drip troughs having a drain outlet 14. The manifolds are shown as provided with vacuum tight detachable caps or plugs 15 and 16 to permit access to and cleaning of the manifolds when required.

The condensers, which are shown separated from their container in Fig. 5 comprise a main condenser and an auxiliary condenser. The head 17 of the main condenser has a pipe 18 for connection to the manifolds through the inlet pipe 6 and it has a separate S-shaped duct or pipe line made up of upper and lower sections 20 and 21 and upright pipe 22 with side connecting pipe for the vacuum pump connection at 23.

The condensers are suitably supported within a freezing tank 24 which is located within and insulated from an outer casing 25 by suitable insulating material 26 to minimize heat transfer to and from the freezing mixture in the tank. A drain pipe 27 is connected to the bottom of the freezing tank 24 and may be shut off by means of a valve or other suitable stopper. Valves, if used, should be made of materials unaffected by very low temperatures since otherwise they would tend to freeze up solid and become difficult to open when the tank must be drained. To permit access to and cleaning of the condensers, removable plugs or closures 28 and 29 are provided.

The condensers are also provided with a connection 30 for a vacuum gauge (not shown), and also with a line 31 leading to a suitable vacuum pump 32. The use of a suitable vacuum gauge makes it possible to determine readily whether the proper vacuum is obtained and maintained during the desiccation period.

The condenser 7 serves as the main condenser, while the S-shaped pipe line 20, 21, acts as a trap and a secondary condenser for any condensate which may pass through the main condenser and which might otherwise be carried over into the vacuum pump.

I have found it of advantage to construct the condensers of two different kinds of metal, making the lower portions of the condenser of a material of good thermal conductivity, such as copper, and making the upper portions of a material of poor thermal conductivity, such as stainless steel. I have found that if the upper portions of the condensers, which are exposed to the atmosphere, are made of a poor thermal conductor, the forming of condensates on the outside, and the subsequent frosting over, are prevented. Economy of dry ice is also effected by this avoidance of atmospheric condensation. The freezing of the plugs by condensate on the interior of the loop portion 20 is also thereby avoided. Also the head 17 and ducts 18 of the main condenser 7 are made of a material of poor thermal conductivity, while the rest of the condenser, being submerged in the freezing mixture, is made of a material of good thermal conductivity. The good thermal conductivity of the rest of the condenser provides ample and extensive interior cooling surface even if the level of the freezing mixture in tank 24 is low. The condenser 7 must be of ample capacity, and is preferably not spherical in shape, but of a shape to give a more extended surface, such as the generally cylindrical shape shown in Fig. 5.

The secondary condenser or trap is similarly made with its lower section 21 of material of good thermal conductivity and with its upper portion 20 and upright pipe 22 of material of poor thermal conductivity, for reasons above stated.

It will be understood that, during the operation of the apparatus, the freezing tank 24 will contain a freezing mixture around the condenser, and this mixture may, as previously pointed out, advantageously be made up of Methyl Cellosolve and Dry Ice.

After finishing the desiccation of a lot of containers, the walls of the condenser 7 are covered with frosted condensate or ice. It is desirable to be able to melt this ice down quickly so that the contents of the condenser 7 can be quickly siphoned off by removing the plug 28 and inserting a siphon tube through the connection 6 and duct 18. In order to provide for melting this ice, the freezing mixture in the tank 24 is heated by means of an electrical strip or ring heater or steam coils attached to the bottom of the tank 24. The heater shown is an electrical heater 33 with an outside connection 34 for supplying current. The condenser structure as a whole, with its surrounding containers, is supported in any suitable manner, as by supports 35 shown.

As already pointed out, each of the manifolds 15 is provided with a number of quick acting adapters or chucks, of which two forms are shown in Figs. 3 and 4. These are of a suitable size to receive and hold the exhaust tube in a vacuum-tight connection with the manifolds. With small containers, the glass exhaust tubes are strong enough to support the containers in the desired position, although containers with flexible tube connectors may be similarly supported, or may be separately supported by a supporting rack (not shown). The containers are preferably supported in a slanting position, to facilitate drainage of liquid or condensate therefrom into the drip trough 13.

Any desired number of the quick acting adapters 11 may be placed in rows along the manifold, depending on the size of the containers and the capacity of the condensers. A definite relation exists between the number and size of containers on the one hand and the maximum capacity of the condenser on the other, and the condensing capacity should be adequate for the number and size of containers connected during the operation. It will be understood that not all of the adapters need be used at the same time, but that some of them may be plugged and only part of the outlets of the manifold utilized.

One suitable form of adapter or chuck 11 is shown in Fig. 3. This adapter comprises a stem-like cylindrical body 40 fastened with a vacuum-tight connection to the manifold. On the outside of the body 40 are provided threads 41 which mate with threads on the inside of the ferrule 42. By providing special free-turning quick-acting threads, for example, four threads per inch, a slight turn of the ferrule 42, amounting to only about one-half a complete revolution, when proportions are right, will clamp the exhaust tubes instantly into a dependable gas-tight connection. The cylindrical body 40 is hollow and of a suitable size to receive the resilient and compressible rubber sleeve or tube 43, which is of considerable length and also of substantial thickness. This sleeve or tube rests against a shoulder in the body 40 and is pressed against the shoulder by the metal sleeve 44 which fits loosely inside the ferrule 42 and body 40 and is in the form of a hollow cylinder with a shoulder abutting the flange 45 of the ferrule 42.

The construction and arrangement is such that when the exhaust tube of a container is placed in the hole through the adapter, and the ferrule 42 is tightened by turning it slightly, the long rubber sleeve or tube 43 will be compressed inwardly around the exhaust tube to form a long surface contact therewith and a vacuum tight connection between the container and the manifold.

In the operation of an apparatus of this kind, where a large number of containers are to be desiccated at the same time, it is of the greatest importance that the connections be made rapidly. The adapters are therefore made so that the tubes can be easily and quickly inserted and almost instantly sealed with a vacuum tight connection with only a slight turn of the ferrule.

The arrangement of parts shown in Fig. 3 also permits the use of long rubber sleeves or tubes of varying inside diameter to accommodate exhaust tubes of varying diameter, for example, tubes with a 4 mm. inside bore or tubes with a 7 mm. inside bore. The rubber sleeves or tubes 43 are readily removable, and other similar tubes may be substituted to permit the use of connecting tubes of a size which is in proportion to the containers to be desiccated. It is moreover one advantage of the use of such long rubber sleeves or tubes that they permit a considerable tolerance in the outside diameter of the connecting tubes inserted therein, and will nevertheless give a vacuum tight seal with tubes of somewhat varying outside diameter. The same adapters can therefore be used with glass connecting tubes of somewhat varying outside diameter and a vacuum tight connection nevertheless obtained quickly with only a small degree of turning of the ferrule 42. In glass tubing there is frequently a tolerance of 15% or somewhat more in the outside diameter of the tubes, and the adapters shown permit quick and easy attachment of tubes of such varying diameter so that it is not necessary to have either accurate sizing of the exhaust tubes or accurate or exact inside diameter of the rubber sleeve or tube.

In Fig. 4 a modified form of quick acting adapter or chuck is shown, generally similar to that of Fig. 3 but with the quick action obtained by the use of a lever valve, with a lever action about an eccentric axis. In the construction shown in this figure, the outer cylindrical body 46 has a flange 48 against which the rubber sleeve 47 abuts at its inner end. A metal cap 49 encloses the outer end of the rubber sleeve. A lever arm 50 pivoted at one end by an adjustment screw as shown and guided between guides at the other end is operated by the pivoted eccentric handle 51. By inserting the exhaust tube of the container through the opening in the lever arm 50 and into the opening in the rubber sleeve 47 and by then operating the handle 51 the lever 50 acts upon the metal cap 49 and compresses the rubber sleeve 47, thus making a vacuum-tight seal around the rubber tube and also between the rubber sleeve and the surrounding metal. The arrangement is such that the exhaust tube can be inserted and the lever operated almost instantly so that a large number of tubes can be inserted and sealed with a vacuum-tight seal in a minimum of time.

The provision of a long thick rubber sleeve or tube with a quick acting clamping device for compressing this sleeve from its ends has important advantages. The inside diameter of the sleeve in its uncompressed state is large enough for the outer diameter of glass exhaust tubes at the largest end of the diameter tolerance range and these tubes readily slip into the rubber sleeve without any lubrication whatever (either aqueous or oil). The rapid and extensive compression of these soft rubber tubes or sleeves nevertheless makes possible the obtaining of a high vacuum seal with even the smallest diameter glass exhaust tube within the usual tolerance range; and the seal is obtained without the use of any lubricant to aid in obtaining a vacuum-tight seal. A sufficiently extended surface contact is provided between the compressed rubber and the glass and also between the rubber and the surrounding metal to insure a high vacuum seal without the use of a lubricant. So, also, the avoidance of a lubricant results in much less danger of contamination. The rubber sleeves are also quickly interchangeable to give a somewhat increased or decreased interior opening so as to make the valve usable for a number of different tolerance ranges.

It will be noted in Figs. 3 and 4 that the metal parts at the ends of the rubber sleeve are tapered and are of somewhat larger inside diameter than the opening through the rubber tube. By tapering these metal parts as shown, and by having a sufficient inside diameter, the glass will not be forced against the metal part at any point, even though the rubber tube may clamp the glass tube somewhat at an angle as the result of the tightening of the valve and the compression of the rubber. Danger of breakage of the glass tube from being forced into contact with the metal is thus eliminated.

The construction of the freezing pans is illustrated in Figs. 7, 8 and 9. The freezing pan 36 may vary in size with the number of containers to be attached to the manifold and these freezing pans are conveniently located at one side of and below the manifold, as shown, to facilitate removal of the containers from the freezing pan and their attachment to the manifold.

The freezing pans have outer and inner containers 54 and 55 with insulation 56 between them, and they are suitably supported in any convenient manner, as shown. These freezing pans have a plurality of supports 57 for the individual containers, to accommodate containers of varying diameter and length in a horizontal position as shown. The supports are so arranged as to support the containers at a distance from the bottom of the freezing pans so as to permit an excess of solid carbon dioxide to be present initially with the organic liquid such as Methyl Cellosolve.

Provision is also made, in the freezing pans, for holding the exhaust tubes in an upright position, and also for rocking the containers when desired. The provision shown is a slide 58 having recesses 59 therein for receiving the upright exhaust tubes. Slots 60 in the ends of the slide and pins 61 extending through these slots permit sliding of the slide back and forth by the use of the operating handle 62, and, since the exhaust tubes fit loosely in the recesses 59, the movement of the slide causes lateral movement of the exhaust tubes and rocking of the containers. All of the containers in a freezing pan can thus be rocked simultaneously, during freezing, to increase the area of frozen material on the inside of the containers. The freezing mixture in the freezing bath may vary, but is advantageously made with Methyl Cellosolve and Dry Ice, as previously explained.

The apparatus shown in Fig. 6 is intended for larger scale operations than that of Figs. 1 and 2 and is, moreover, adapted for continuous operation with the addition of one or more manifolds to the system while it is under a high vacuum, and with the possibility of disconnecting one or more manifolds without interfering with the continued operation.

The apparatus of Fig. 6 is provided with a plurality of manifolds and with an auxiliary condensing and pumping system and with provision for connecting or disconnecting the individual manifolds with the main condensers and vacuum systems or with the auxiliary condensers and vacuum pumps.

The apparatus illustrated in Fig. 6 has a number of manifolds, of which two are shown at 63 and 64. These are connected by large flexible soft rubber tubes 66 to a header 68, clamps 67 clamping the thick rubber tube to the manifold and to the header. From the header 68 the pipe 69 leads to a condenser 70 similar to the condenser 7 of Figs. 1 and 5. A supplemental condenser 71 is similarly provided and both condensers are enclosed within a container adapted to have a suitable freezing mixture, the construction and arrangement being similar to that of Figs. 1 to 5, but with the condensers materially larger in size.

From the supplemental condenser a vacuum line 74 leads to the vacuum pump 75. A separate line 76 leads to a vacuum gauge, e. g., of the McLeod type (not shown) for indicating the vacuum in the apparatus.

Each of the manifolds has a small side connection 78 connected by a flexible rubber pipe 79 to an auxiliary condenser 80 which in turn is connected with an auxiliary vacuum pump 81. Separate lines 82 lead to an auxiliary pressure gauge or vacuum gauge (not shown).

By the use of powerful clamps, such as are illustrated in Fig. 6 as attached to the rubber tubes 79, these tubes, or either of them, can be shut off from the header, thus disconnecting the header from the auxiliary pumping system. Similarly either or both of the large tubes 66 can be shut off, thus disconnecting either or both of the manifolds from the main condensing system. By disconnecting one manifold from the large condenser, and connecting it with the auxiliary condenser, one manifold can be disconnected from the main system without interfering with the maintenance of a high vacuum on the rest of the system. When the manifold has the individual containers connected thereto, the vacuum can be applied to the manifold by the auxiliary pumping system until the pressure reaches that of the rest of the system, when the manifold can be connected with the rest of the system.

The arrangement is such that one or more of the manifolds can be connected or disconnected as desired without interfering with the operation of the process and the maintenance of the vacuum on the rest of the system.

The provision of an auxiliary pumping system enables a manifold and the containers attached to it to be quickly evacuated to a high vacuum at a time when it is disconnected from the main system. The entire remainder of the apparatus is previously pumped down by the main pumping system from which the manifold is shut off. This auxiliary pumping system makes possible such rapid evacuation as is necessary to attain quickly the degree of vacuum necessary for the distillation to proceed at the high rate of evaporation required for cooling the serum, etc. and for keeping it frozen. It is necessary to achieve this degree of vacuum before even the surface of the serum starts to melt in the container. This means that only a few minutes is permitted for this operation.

The provision of an auxiliary pumping system also makes possible the use of smaller pumps than would otherwise be necessary, and makes possible the processing of thousands of containers, and with continuous operation, by distillation into a single large condenser. Each manifold may, for example, have connections for 100 containers, and each manifold, with its containers attached, can be pumped down separately and quickly by the auxiliary system, and can then be connected with the larger condenser. Following the first unit or manifold, the next unit or manifold of, for example, 100 containers, can be similarly rapidly evacuated and then opened into the main condenser, and so on with further units. If several hundred containers are attached to the system at once, and the single condenser and vacuum pump relied upon, a considerable time would be required to reduce the vacuum to the necessary extent, or a pump of excessive size would be required; and there would be danger of melting of the frozen contents of the containers before the necessary high vacuum could be established.

By providing such an auxiliary or secondary system as that shown in Fig. 6, the large condensers may be evacuated and remain under a high vacuum for long periods of time, until the condensation of ice in the condensers makes it necessary to discontinue the operation to thaw the condensers; although separate condensers can be connected to permit continued operation when one large condenser must be disconnected.

With the auxiliary pumping system, an individual manifold with, for example, 100 outlets and with 100 containers attached thereto, can be rapidly pumped down to a high vacuum by the auxiliary pumping system, while this manifold is disconnected from the main system. It can then be connected to the main system without disturbing the continuous operation of that system. When the containers attached to a manifold have been dried and are ready for removal, the manifold and its containers can similarly be disconnected from the main system and connected to the auxiliary system, and the pressure can then be admitted to permit removal of the containers, preferably after they have been sealed to maintain the original vacuum therein, as set forth in more detail in my companion application Serial No. 54,148, filed December 12, 1935.

The auxiliary pumping system thus makes possible the successive addition of a number of individual containers to a single manifold, and the removal of the containers from a manifold without interfering with the process that is going on in the containers attached to other manifold units. The main condenser may, for example, be of sufficient capacity to permit of at least one week's continuous operation at full capacity.

The apparatus of Fig. 6 also provides for flexibility of operation, since a larger or smaller number of manifolds can be connected with a system, or can be connected at successive time intervals.

The rubber tube connections in the apparatus shown in Fig. 6 should have a wall thickness sufficient to prevent collapse by the vacuum. With a rubber tube having a two inch bore, the wall thickness should be as much as a third or a half of the inside diameter, for example, a wall thickness of one inch. The rubber should be a relatively pure gum non-blooming stock and free from sulfur and talc. Such a rubber hose can be satisfactorily clamped off with high vacuum tightness by the use of a special lever clamp made, for example, of about three-quarter inch steel bars, 36 inches long. The distance between the bars must be such that the two thicknesses of the rubber wall will be compressed into the thickness of one, that is, that a tube having a two inch inside bore and a wall thickness of one inch would be compressed into a total thickness of about one inch. The smaller rubber tube connections to the auxiliary pumping system can be similarly shut off by a similar but smaller lever clamp.

About 100 containers is the maximum number recommended for a single manifold unit. This number of containers can be attached by one person in a sufficiently short period of time to permit evacuation in the manifold and beginning of self-refrigeration without the contents of the containers first attached beginning to melt.

A manifold for 100 containers containing a total of as much as 5 to 10 liters of material should have a bore of about 3 inches. A materially larger size of manifold would retard evacuation by the auxiliary system.

Various containers are shown in Figs. 10 to 19. Two empty containers 85 and 86, such as referred to in Table I, are shown in Figs. 10 and 11.

In Fig. 12 the container 87 is shown as having a rubber stopper 88 therein from which extends a glass exhaust tube 89.

In Fig. 13 the stopper 90 is shown as having an integral rubber tube 91 extending therefrom which in turn is connected to a glass exhaust tube 92, shown separately in Fig. 14. A metal clamp 93 is shown in place around the rubber exhaust tube but the clamp has not been compressed to seal the tube.

Figs. 15, 16, 17 and 18 show four final containers sealed to maintain the vacuum therein. In Fig. 15 the container is such as illustrated in Fig. 12 but with the glass exhaust tube sealed, and with the container containing the dry final or lyophilic product indicated at 95. The glass seal is indicated at 94. Fig. 16 shows a similar container but with the combined rubber tube closure of Fig. 13, with the clamp 93 compressed to seal the tube and with the tube cut off above the clamp.

In Figs. 15 and 16, the final product, as will be noted, occupies about one-half or somewhat less of the space in the cylindrical container, and is at one side. The space it occupies is practically that of the original frozen material.

The rubber stopper shown in Figs. 12 and 15 is shown in sections in Fig. 19. In addition to the hole for the glass exhaust tube, this rubber stopper has another hole extending only part way through the stopper as indicated at 97, leaving a thin section 96 through which a hypodermic needle can be inserted when it is desired to restore the product by the addition of water thereto. The stopper shown in Figs. 13 and 16 has a similar thin portion for facilitating the introduction of liquid. This thin portion of the rubber stopper is nevertheless sufficient to maintain the vacuum until it is punctured or perforated.

Figs. 17 and 18 show somewhat different forms and arrangements of the containers. In Fig. 17 a small round glass container is shown with an integral glass tubular extension sealed off at 99 and with a side extension 100 having a perforable rubber stopper 101 therein.

Fig. 18 shows a smaller final container similar to that of Fig. 16 but in this case the amount of material is so small that it may all be contained in the bottom of a container.

In carrying out the process, with the apparatus illustrated, the individual containers are filled with the required amount, such as a unit or clinical amount, of the serum or other biological product, the stopper is securely placed in the container with the L-shaped exhaust tube extending therefrom, and the container is then placed in the freezing bath in a horizontal position. The containers which may be used, according to the present invention, are very much smaller in proportion to the contents to be processed in them, than has heretofore been possible. The containers should be well covered by the solid-liquid freezing mixture and should remain in this bath for a sufficient period of time, usually a full half hour. This is important in order that the temperature of the serum or other material attain as low a temperature as possible before the removal of the container from the freezing bath, and in order that the contents may with certainty be brought to equilibrium and cooled to practically the temperature of the refrigerating bath, i. e., around —78° C. It is important that the serum or other material in the small individual containers attain as low a temperature as possible because, after the removal of the containers from the freezing bath, and during the time required for attaching it to the manifold and for exahusting the manifold to bring about automatic self-refrigeration, the containers should not be permitted to rise in temperature sufficiently to melt any portion of the frozen material.

In freezing the material in containers having small amounts, less than 1.0 ml. per container, as in the case of bacterial vaccine, for example, freezing of the container on its side is unnecessary in order to secure a large evaporating surface and with such small containers it is advantageous to have the freezing pans in such a position that the material can be frozen after attachment of the containers to the manifold but prior to evacuation. With small single containers containing such a small amount of material, it is of advantage to keep the containers in the freezing mixture until the proper degree of evacuation has been obtained and the automatic temperature control is secured. The process is thereafter carried to completion with automatic temperature control, as hereinbefore described. With larger containers, containing a somewhat larger amount of serum or other material, and with the ratio of volume and surface hereinbefore described, and in containers of proper size and shape, the containers can be rapidly attached, after removal from the freezing bath, to the manifold, and the manifold rapidly evacuated to start self-refrigeration or automatic temperature control.

During the evacuation the frozen product remains solid, ice sublimes or vaporizes from the interior surface, and the individual containers are heated on the outside by atmospheric air. After a short time, water usually condenses from the air and forms a layer of frost or ice on the outside of the containers. When the process nears completion the contents of the containers rise above 0° C. and the ice layer melts and is collected in the drip pan. The process is then continued for a sufficient period of time to permit the material to rise to approximately atmospheric temperature and to insure the removal of water down to the necessary extent, for example, to less than 1% or around 0.5%, as determined by heating at 110° C. in a drying oven.

When the process is completed, the individual containers are advantageously sealed under their original vacuum, as more particularly described in my companion applications, Serial No. 54,148 and 106,105, which latter application was filed October 17, 1936.

The apparatus of the present invention is adapted for a wide range of applications, and to varying amounts of materials. An apparatus such as shown in Figs. 1 and 2 is a unit apparatus adapted for use where a limited production is desired. An apparatus such as that of Fig. 6 is adapted for large scale operations and for the processing of animal serum and other commercial products to make these available in commercial quantities and in the individual containers in which the products can be protected from contamination from the time the original liquid serum or other material is placed in the container until the container is finally sealed at the end of the process.

The present invention provides apparatus useful for the treatment of a wide range of biological products, including sera, viruses, and vaccines of various kinds as well as protein solutions and other labile biological substances. Various protein substances can be satisfactorily processed and preserved. Human milk, for example, can be readily preserved in containers of nursing bottle or larger size. Various proteins have also been preserved in lyophilic form, including egg albumen, serum albumen, lens protein, serum pseudo globulin, and euglobulin. Even such labile substances as fibrinogen and prothrombin have been satisfactorily preserved and have retained their solubility and biological activities over long periods of time.

I do not in this application claim the new process of producing the biological substances subdivided in small amounts in the desiccated state in small, individual final containers, as this is claimed in my divisional application Serial No. 126,056 filed February 16, 1937; but in this application I claim the new apparatus primarily adapted for the production of such products.

I claim:

1. An apparatus for the dehydration of frozen biological products under a high vacuum having at least one condenser adapted to be immersed in a low temperature bath, the lower part of the condenser which is so immersed being of material which is a good conductor of heat, and the upper portion of the condenser being of a material which is a poor conductor of heat.

2. A condenser for use in the condensation of water vapor under a high vacuum, said condenser comprising a main condenser having an inlet pipe extending downwardly into the interior thereof and having an outlet pipe from the top thereof, an auxiliary condenser connected thereto, and a surrounding casing for surrounding the main and auxiliary condensers with a low temperature medium, the lower parts of the condensers which are submerged in such medium being made of metal which is a good conductor of heat and the upper parts of said condensers, and the pipes connected thereto, being made of metal which is a poor conductor of heat.

3. An apparatus for the continuous dehydration of frozen biological material under a high vacuum comprising a plurality of manifolds, at least one main condensing system and at least one evacuating device for establishing a high vacuum of a fraction of a millimeter of mercury, in said condensing system, an auxiliary condensing system and vacuum producing means, and connections from both said main condensing system and auxiliary condensing system to each of said manifolds together with means for disconnecting the manifolds from either of said systems, each of said manifolds having a number of outlets each adapted for the attachment of a container of frozen biological material thereto, whereby a vacuum of a fraction of a millimeter of mercury can be established in an individual manifold and in the containers attached thereto independently of the vacuum maintained in the main condensing system, and whereby the manifold in which the vacuum has thus been separately established can then be connected to the main condensing system.

4. In the apparatus set forth in the preceding claim, the further improvement of providing flexible connections between the manifolds and the separate condensing systems, said flexible connections being rubber tubes having a wall thickness of at least one-third to one-half the inner diameter and clamps being provided for damping said tubes with sufficient pressure to compress the tube to the normal wall thickness to insure a vacuum-tight closing of said tubes.

5. An apparatus for the rapid and continuous dehydration of frozen biological material under a high vacuum of a fraction of a millimeter of mercury and in a large number of individual containers, said apparatus comprising a plurality of manifolds, each having a number of outlet connections for the connection of a number of individual containers thereto, said outlets having quick-acting chucks for permitting almost instantaneous attachment of the exhaust tube of a container thereto, a main condensing system and vacuum pump, an auxiliary condensing system and vacuum pump, connections from both the main and auxiliary systems to the manifolds and means for shutting off the connection from either system to any of the manifolds, whereby any manifold can be connected to either system or both systems or disconnected therefrom, thereby permitting the attachment of a number of containers of frozen material to a manifold, and the removal of the containers of finished material therefrom without interfering with the continuous dehydration of frozen material in other containers attached to other manifolds.

6. Apparatus for the continuous dehydration of frozen biological material under a high vacuum of a fraction of a millimeter of mercury and in a large number of individual containers, said apparatus comprising a plurality of chambers, each having means for communication with a number of individual containers, a main condensing system and vacuum pump, an auxiliary condensing system and vacuum pump, connections from both the main system and the auxiliary system to said plurality of chambers, means for shutting off the connection from either system to any of the chambers whereby any chamber can be connected to either system or both systems or disconnected therefrom, thereby permitting communication of a number of containers of frozen material with a condensing system and removal of containers of finished material without interfering with the continuous dehydration of frozen material in other containers communicating with other chambers.

EARL W. FLOSDORF.